US012666411B2

(12) United States Patent
Jiang

(10) Patent No.: US 12,666,411 B2
(45) Date of Patent: Jun. 23, 2026

(54) SIGNAL TRANSMITTING/RECEIVING METHOD AND APPARATUS, AND SIGNAL RECEIVING METHOD AND APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 269 days.

(21) Appl. No.: 18/384,225

(22) Filed: Oct. 26, 2023

(65) Prior Publication Data

US 2024/0057054 A1 Feb. 15, 2024

Related U.S. Application Data

(63) Continuation of application No. PCT/CN2021/090775, filed on Apr. 28, 2021.

(51) Int. Cl.
*H04W 72/0453* (2023.01)
*H04W 8/00* (2009.01)

(52) U.S. Cl.
CPC ....... *H04W 72/0453* (2013.01); *H04W 8/005* (2013.01)

(58) Field of Classification Search
CPC .. H04W 72/0453; H04W 8/005; H04W 64/00
See application file for complete search history.

(56) References Cited

U.S. PATENT DOCUMENTS

| | | |
|---|---|---|
| 2012/0093007 A1 | 4/2012 | Kang et al. |
| 2015/0139213 A1 | 5/2015 | Abraham et al. |
| 2016/0100352 A1 | 4/2016 | Yunok |

| | | | |
|---|---|---|---|
| 2017/0332314 A1 | 11/2017 | Yunoki | |
| 2019/0115946 A1* | 4/2019 | Pehlke | H04B 1/04 |
| 2021/0006652 A1 | 1/2021 | Edvina et al. | |
| 2021/0256418 A1 | 8/2021 | Creedon et al. | |
| 2022/0256519 A1* | 8/2022 | Cho | G01S 7/0235 |
| 2022/0311571 A1* | 9/2022 | Cheng | H04L 5/005 |
| 2022/0357418 A1* | 11/2022 | Wang | H04W 4/02 |
| 2022/0369092 A1* | 11/2022 | Lee | H04W 8/005 |
| 2024/0114330 A1* | 4/2024 | Xu | H04W 8/005 |
| 2024/0430840 A1* | 12/2024 | Duan | H04L 5/0051 |

FOREIGN PATENT DOCUMENTS

| | | |
|---|---|---|
| CN | 101341722 A | 1/2009 |
| CN | 101578792 A | 11/2009 |
| CN | 102972060 A | 3/2013 |
| CN | 105165070 A | 12/2015 |
| CN | 110221243 A | 9/2019 |
| CN | 112219437 A | 1/2021 |
| CN | 112673339 A | 4/2021 |

OTHER PUBLICATIONS

International Search Report of PCT/CN2021/090775 dated Jan. 26, 2022 with English translation, (4p).
CNOA issued in Application No. 202180001168.2 dated May 30, 2025 with English translation, (16p).

* cited by examiner

*Primary Examiner* — Tonia L Dollinger

(74) *Attorney, Agent, or Firm* — Arch & Lake LLP

(57) ABSTRACT

The present disclosure relates to a method for transceiving a signal, performed by a first terminal. The method includes: transceiving at a first frequency a first signal; and transceiving at a second frequency a second signal; wherein the first frequency is different from the second frequency.

17 Claims, 5 Drawing Sheets

Transceive at a first frequency a discovery signal for device discovery ⌇~S101

Transceive at a second frequency a discovery control signal for controlling the device discovery; the first frequency is different from the second frequency ⌇~S102

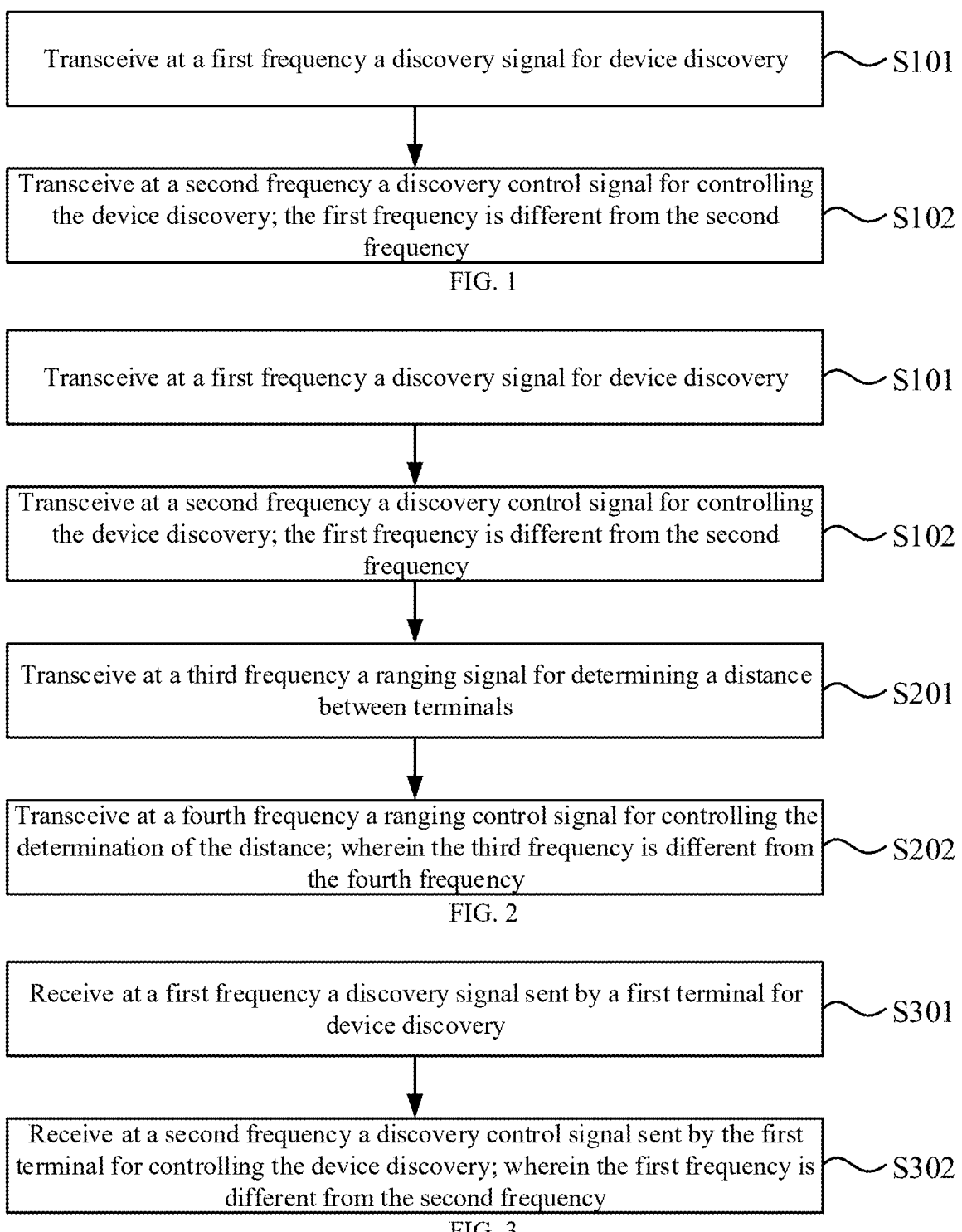

Transceive at a first frequency a discovery signal for device discovery — S101

Transceive at a second frequency a discovery control signal for controlling the device discovery; the first frequency is different from the second frequency — S102

FIG. 1

Transceive at a first frequency a discovery signal for device discovery — S101

Transceive at a second frequency a discovery control signal for controlling the device discovery; the first frequency is different from the second frequency — S102

Transceive at a third frequency a ranging signal for determining a distance between terminals — S201

Transceive at a fourth frequency a ranging control signal for controlling the determination of the distance; wherein the third frequency is different from the fourth frequency — S202

FIG. 2

Receive at a first frequency a discovery signal sent by a first terminal for device discovery — S301

Receive at a second frequency a discovery control signal sent by the first terminal for controlling the device discovery; wherein the first frequency is different from the second frequency — S302

FIG. 3

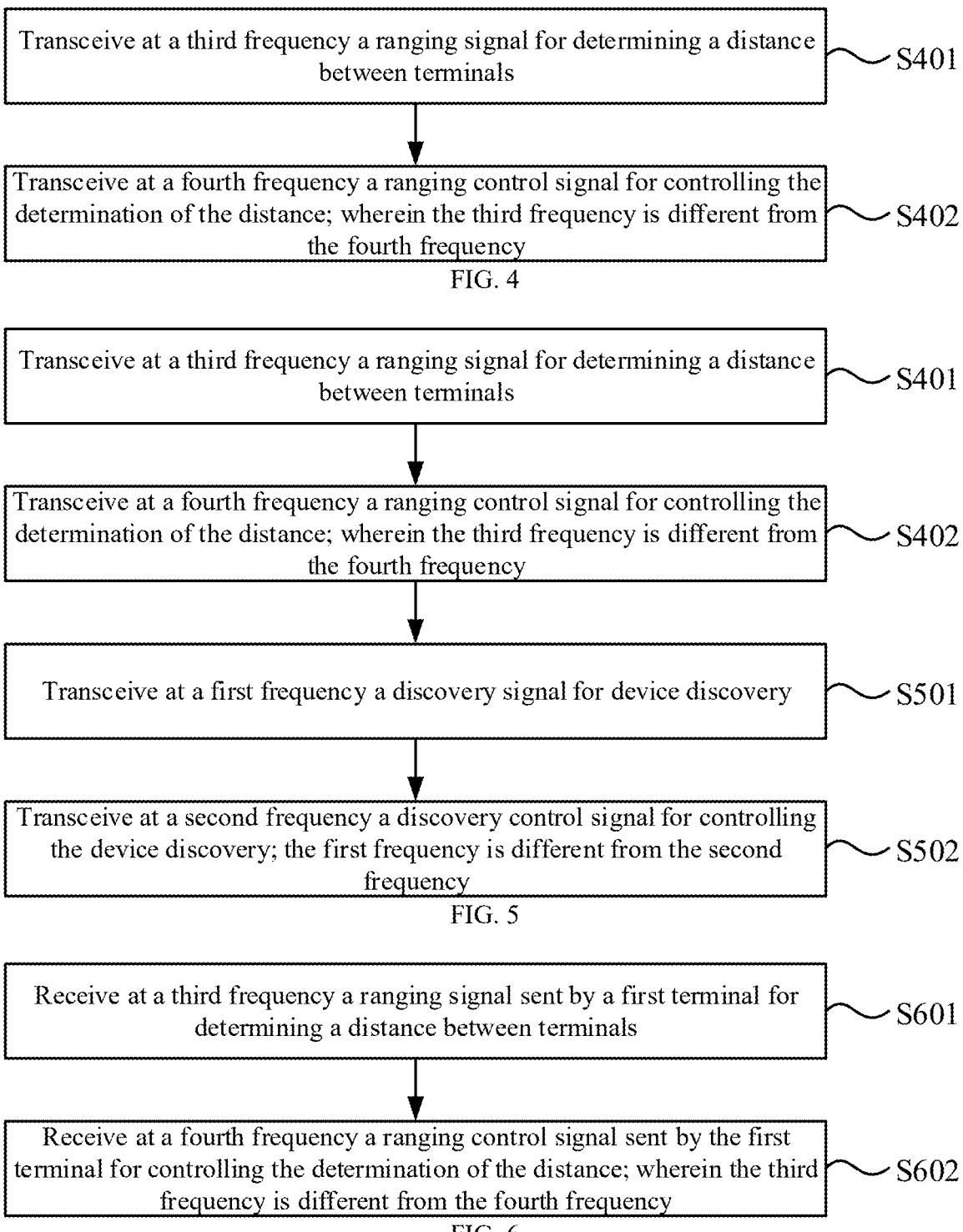

Transceive at a third frequency a ranging signal for determining a distance between terminals — S401

Transceive at a fourth frequency a ranging control signal for controlling the determination of the distance; wherein the third frequency is different from the fourth frequency — S402

FIG. 4

Transceive at a third frequency a ranging signal for determining a distance between terminals — S401

Transceive at a fourth frequency a ranging control signal for controlling the determination of the distance; wherein the third frequency is different from the fourth frequency — S402

Transceive at a first frequency a discovery signal for device discovery — S501

Transceive at a second frequency a discovery control signal for controlling the device discovery; the first frequency is different from the second frequency — S502

FIG. 5

Receive at a third frequency a ranging signal sent by a first terminal for determining a distance between terminals — S601

Receive at a fourth frequency a ranging control signal sent by the first terminal for controlling the determination of the distance; wherein the third frequency is different from the fourth frequency — S602

FIG. 6

SIGNAL TRANSMITTING/RECEIVING METHOD AND APPARATUS, AND SIGNAL RECEIVING METHOD AND APPARATUS

CROSS-REFERENCE

The present application is a Continuation Application of PCT Application No. PCT/CN2021/090775, filed on Apr. 28, 2021, the contents of which are incorporated herein by reference in their entireties for all purposes.

TECHNICAL FIELD

The present disclosure relates to the field of communication technologies, and more particularly, to a method for transceiving a signal, a method for receiving a signal, an apparatus for transceiving a signal, an apparatus for receiving a signal, a communication device and a non-transitory computer-readable storage medium.

BACKGROUND

Ranging-based services can exploit a relative distance and/or relative angle between two devices to provide services. During the execution of the ranging, a device needs to first discover a peer device, then sends a ranging signal, and in turn determines the relative distance based on a transceiving time of the ranging signal.

In order to ensure the smooth progress of the discovery process and the ranging process, it is further necessary to properly control the discovery process through a discovery control signal, and to properly control the ranging process through a ranging control signal.

SUMMARY

Embodiments of the present disclosure provide a method for transceiving a signal, a method for receiving a signal, an apparatus for transceiving a signal, an apparatus for receiving a signal, a communication device and a non-transitory computer-readable storage medium.

According to a first aspect of embodiments of the present disclosure, there is provided a method for transceiving a signal, which is applicable to a first terminal. The method includes: transceiving at a first frequency a discovery signal for device discovery; and transceiving at a second frequency a discovery control signal for controlling the device discovery; where the first frequency is different from the second frequency.

According to a second aspect of the embodiment of the present disclosure, there is provided a method for receiving a signal, which is applicable to a network device. The method includes: receiving at a first frequency a discovery signal sent by a first terminal for device discovery; and receiving at a second frequency a discovery control signal sent by the first terminal for controlling the device discovery; where the first frequency is different from the second frequency.

According to a third aspect of embodiments of the present disclosure, there is provided a method for transceiving a signal, which is applicable to a first terminal. The method includes: transceiving at a third frequency a ranging signal for determining a distance between terminals; and transceiving at a fourth frequency a ranging control signal for controlling the determination of the distance, where the third frequency is different from the fourth frequency.

According to a fourth aspect of embodiments of the present disclosure, there is provided a method for receiving a signal, which is applicable to a network device. The method includes: receiving at a third frequency a ranging signal sent by a first terminal for determining a distance between terminals; and receiving at a fourth frequency a ranging control signal sent by the first terminal for controlling the determination of the distance, where the third frequency is different from the fourth frequency.

According to a fifth aspect of embodiments of the present disclosure, there is provided an apparatus for transceiving a signal, which is applicable to a first terminal. The apparatus includes: a discovery signal transceiver module, configured to transceive at a first frequency a discovery signal for device discovery; and a first control signal transceiver module, configured to transceive at a second frequency a discovery control signal for controlling the device discovery, where the first frequency is different from the second frequency.

According to a sixth aspect of the embodiment of the present disclosure, there is provided an apparatus for receiving a signal, which is applicable to a network device. The apparatus includes: a discovery signal receiving module, configured to receive at a first frequency a discovery signal sent by a first terminal for device discovery; and a first control signal receiving module, configured to receive at a second frequency a discovery control signal sent by the first terminal for controlling the device discovery, where the first frequency is different from the second frequency.

According to a seventh aspect of embodiments of the present disclosure, there is provided an apparatus for transceiving a signal, which is applicable to a first terminal. The apparatus includes: a ranging signal transceiver module, configured to transceive at a third frequency a ranging signal for determining a distance between terminals; and a first control signal transceiver module, configured to transceive at a fourth frequency a ranging control signal for controlling the determination of the distance, where the third frequency is different from the fourth frequency.

According to an eighth aspect of embodiments of the present disclosure, there is provided an apparatus for receiving a signal, which is applicable to a network device. The apparatus includes: a ranging signal receiving module, configured to receive at a third frequency a ranging signal sent by a first terminal for determining a distance between terminals; and a first control signal receiving module, configured to receive at a fourth frequency a ranging control signal sent by the first terminal for controlling the determination of the distance, where the third frequency is different from the fourth frequency.

According to a ninth aspect of an embodiment of the present disclosure, there is provided a communication device, including: a processor; and a memory configured to store instructions executable by the processor; where the processor is configured to execute the method for transceiving the signal as described above.

According to a tenth aspect of an embodiment of the present disclosure, there is provided a communication device, including: a processor; and a memory configured to store instructions executable by the processor; where the processor is configured to execute the method for receiving the signal as described above.

According to an eleventh aspect of embodiments of the present disclosure, there is provided a non-transitory computer-readable storage medium configured to store a computer program, where the program, when executed by a processor, implements steps in the method for transceiving the signal as described above.

According to a twelfth aspect of embodiments of the present disclosure, there is provided a non-transitory computer-readable storage medium configured to store a computer program, where the program, when executed by a processor, implements steps in the method for receiving the signal as described above.

BRIEF DESCRIPTION OF THE DRAWINGS

In order to explain technical solutions in embodiments of the present disclosure more clearly, drawings needed in the description of these embodiments will be briefly introduced below. Obviously, the drawings in the following description are only some embodiments of the present disclosure. For those of ordinary skill in the art, other drawings can be obtained from these drawings without creative labor.

FIG. 1 shows a schematic flowchart of a method for transceiving a signal according to an embodiment of the present disclosure.

FIG. 2 shows a schematic flowchart of another method for transceiving a signal according to an embodiment of the present disclosure.

FIG. 3 shows a schematic flowchart of a method for receiving a signal according to an embodiment of the present disclosure.

FIG. 4 shows a schematic flowchart of a method for transceiving a signal according to an embodiment of the present disclosure.

FIG. 5 shows a schematic flowchart of another method for transceiving a signal according to an embodiment of the present disclosure.

FIG. 6 shows a schematic flowchart of a method for receiving a signal according to an embodiment of the present disclosure.

DETAILED DESCRIPTION

Figure 7:
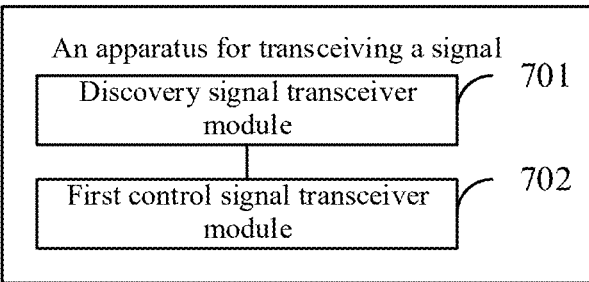
FIG. 7 shows a schematic block diagram of an apparatus for transceiving a signal according to an embodiment of the present disclosure.

The technical solutions in embodiments of the present disclosure will be described clearly and completely with reference to the drawings in embodiments of the present disclosure below. Obviously, the described embodiments are only some of, rather than all of, the embodiments of the present disclosure. Based on the embodiments in the present disclosure, all other embodiments obtained by persons of ordinary skill in the art without making creative efforts belong to the protection scope of the present disclosure.

The terms used in embodiments of the present disclosure are merely for the purpose of describing particular embodiments and are not intended to limit embodiments of the present disclosure. As used in embodiments of the present disclosure and the appended claims, the singular forms "a" and "the" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in embodiments of the present disclosure to describe various information, such information should not be limited to these terms. These terms are only used to distinguish the same type of information from each other. For example, without departing from the scope of embodiments of the present disclosure, first information may also be referred to as second information, and similarly, the second information may also be referred to as the first information. Depending on the context, the word "if" as used herein can be interpreted as "upon" or "when" or "in response to determination."

For the purpose of simplicity and ease of understanding, the terms used herein are "greater than" or "less than," "higher than" or "lower than" when a size relationship is characterized. But for those skilled in the art, it can be understood that the term "greater than" also covers the meaning of "greater than or equal to," and "less than" also covers the meaning of "less than or equal to"; and the term "higher than" covers the meaning of "higher than or equal to," and "lower than" covers the meaning of "lower than or equal to."

FIG. 1 shows a schematic flowchart of a method for transceiving a signal according to an embodiment of the present disclosure. The method for transceiving the signal shown in this embodiment may be applicable to a first terminal, which includes but is not limited to a communication device such as a mobile phone, a tablet computer, a wearable device, a sensor, and an Internet of Things device. The first terminal may serve as a user equipment to communicate with a network device, which includes but is not limited to a base station and a core network. The base station includes but is not limited to a base station in a communication system such as a 4G base station, a 5G base station, and a 6G base station.

As shown in FIG. 1, the method for transceiving the signal may include steps S101 and S102.

In the step S101, a discovery signal for device discovery is transceived at a first frequency.

In the step S102, a discovery control signal for controlling the device discovery is transceived at a second frequency.

The first frequency is different from the second frequency.

It should be noted that an execution order of the above steps S101 and S102 is in no particular order. The execution order may be set as needed, or the above steps S101 and S102 may be executed simultaneously.

In an embodiment of the present disclosure, during a discovery process, the first terminal may send the discovery signal as a discovered terminal. For example, the first terminal sends the discovery signal in a broadcast manner, so that a second terminal (a terminal other than the first terminal) near the first terminal can discover the first terminal. The first terminal may also receive the discovery signal as a discovery terminal. For example, the first terminal receives the discovery signal broadcast by the second terminal near the first terminal, so as to discover the second terminal. In turn, the first terminal and the second terminal can communicate with each other, for example, the relative ranging between the first terminal and the second terminal may be performed through the communication.

An illustrative description of embodiments of the present disclosure is mainly given in a case that the first terminal serves as the discovered terminal and the second terminal serves as the discovery terminal. The first terminal and the second terminal do not refer to certain terminals in particular, but refer to any two different terminals.

In an embodiment of the present disclosure, information that is able to characterize an identity of the first terminal and information about a service to be performed by the first terminal by performing the device discovery may be carried in the discovery signal. For example, an identity of the first terminal and an identity of an application that trigger the device discovery in the first terminal are carried in the discovery signal.

After receiving the discovery signal, the second terminal may determine that the first terminal needs to communicate according to the identity of the first terminal, and may determine which service the first terminal needs to perform according to the identity of the application. The second terminal then may determine whether to communicate with the first terminal based on its own needs. If the second terminal determines to communicate with the first terminal, a direct communication mode or an indirect communication mode may be used for the communication. The direct communication mode includes but is not limited to the sidelink-based communication, and the indirect communication mode includes but is not limited to the communication through the network device (such as the base station, the core network).

In an embodiment of the present disclosure, in order to make the discovery process proceed smoothly, the first terminal may further send the discovery control signal. For example, the first terminal sends to the network device the discovery control signal to negotiate with the network device the identity used by the first terminal during the discovery process.

In the related arts, the discovery signal and the discovery control signal are transceived at the same frequency. However, there are great differences in the content and the function of the discovery signal and the discovery control signal, and transmission requirements that the discovery signal and the discovery control signal need to meet are also different. Transceiving the discovery signal and the discovery control signal at the same frequency is inconvenient to control the transmission of the discovery signal and the discovery control signal and may cause the transceiving of one signal to be interfered by the other signal. For example, some terminals among a plurality of terminals send the discovery signal, while some terminals among the plurality of terminals send the discovery control signal. If the first terminal receives the discovery signal and the discovery control signal at the same frequency, a case that the discovery signal and the discovery control signal arrive at the same time may occur, but the first terminal can only receive one signal at the same moment, causing the first terminal to discard one of a plurality of signals arriving at the same time.

According to embodiments of the present disclosure, the discovery signal may be transceived at the first frequency, and the discovery control signal may be transceived at the second frequency, thereby realizing to respectively transceive the discovery signal and the discovery control signal at different frequencies. Accordingly, it is convenient to separately control the transmission of the discovery signal and the discovery control signal, and to a certain extent, the transceiving of one of the signals can be prevented from being interfered by the other signal.

In an embodiment of the present disclosure, the discovery signal is transceived based on direct communication technologies. For example, the discovery signal may be transceived based on a sidelink mode, a Vehicle To Everything (V2X) mode, a WiFi direct mode, an Ultra Wide Band (UWB) mode, a Bluetooth mode and other modes. Transceiving the discovery signal based on the direct communication technologies can ensure that after the discovered terminal sends the discovery signal, the discovery terminal can receive the discovery signal as soon as possible.

In an embodiment of the present disclosure, the discovery signal is a first signal sequence of a physical layer. The first signal sequence includes but is not limited to a Zadoff-Chu sequence.

In an embodiment of the present disclosure, the first signal sequence is used to carry part or all of an identity of the discovered terminal at L1. The first signal sequence itself may carry some information, for example, it may carry part or all of the identity of the discovered terminal at L1. The specific amount of information that can be carried may depend on the number of signal sequences.

It should be noted that in all embodiments of the present disclosure, L1 refers to layer 1, which mainly includes the physical layer, and L2 refers to layer 2, which mainly includes a data link layer.

In an embodiment of the present disclosure, the first signal sequence has a first payload, and the first payload is used to carry at least one of: an identity of an application corresponding to the device discovery, an identity of the discovered terminal, an identity of the discovered terminal at L1 and an identity of the discovered terminal at L2.

By adding the first payload to the first signal sequence, more information may be carried by the first payload. For example, based on the identity of the application, the service to be performed by the first terminal by performing the device discovery, that is, the service corresponding to the application, may be determined by the second terminal, and accordingly, the second terminal can determine whether to communicate with the first terminal.

The identity of the discovered terminal may be a unique identity of the terminal, such as an International Mobile Subscriber Identity (IMSI), a Temporary Mobile Subscriber Identity (TMSI), an S-TMSI, a Cell Radio Network Temporary Identity (C-RNTI), an I-RNTI. In addition, the identity of the discovered terminal may also be a unique temporary identity within a specified period and/or within a specified area configured by the network device for the discovered terminal.

In an embodiment of the present disclosure, the first payload is physical layer information, or a control plane data packet, or a user plane data packet, which may be, for example, a Medium Access Control Protocol Data Unit (MAC PDU).

In an embodiment of the present disclosure, the discovery signal is the control plane data packet or the user plane data packet.

The control plane data packet includes but is not limited to a Radio Resource Control (RRC) message, a Non-Access Stratum (NAS) message, a Proximity Service (ProSe) message and other dedicated control protocol messages, such as a discovery request message and a discovery response message. In a case that the discovery signal is the control plane data packet or the user plane data packet, the discovery signal is still sent at the first frequency as ordinary data (rather than the control information).

In an embodiment of the present disclosure, the transceiving at the second frequency the discovery control signal for controlling the device discovery includes: sending the discovery control signal to the network device at the second frequency.

The first terminal may send the discovery control signal to the network device. Based on specific functions of the discovery control signal, contents carried in the discovery control signal may be different. For example, the discovery control signal is only used to negotiate with the network device information used to control the device discovery process, then the discovery control signal does not need to carry the identity of the second terminal, and the network device also does not need to send discovery control information to the second terminal. In contrast, if the discovery control signal is used to negotiate with the second terminal the information used to control the device discovery process, the discovery control signal needs to carry the identity of the second terminal, and the network device needs to further send the discovery control information to the second terminal.

The information used to control the device discovery process may be, for example, an identity used by the discovered terminal in the device discovery process, a resource used in the device discovery process, a resource for communication after the device discovery process, etc.

In an embodiment of the present disclosure, the discovery control signal is used to request the network device to assign an identity to the discovered terminal. After receiving the discovery control signal, the network device, on the one hand, can assign an identity to the first terminal for use by the terminal in the device discovery process, and can also, on the other hand, choose to inform the second terminal of the identity assigned to the first terminal. Alternatively, the second terminal can know the identity in advance.

In an embodiment of the present disclosure, the discovery control signal further carries a reason for requesting the network device to assign the identity to the discovered terminal. The network device may assign the identity to the first terminal based on this reason. For example, the network device may assign different identities to the first terminal based on different reasons, and these reasons include but not limited to performing the device discovery, needing to be assigned a user equipment identity, etc.

In an embodiment of the present disclosure, the discovery control signal is carried in a radio access control message or in a non-access stratum message.

In an embodiment of the present disclosure, the discovery control signal carries a mapping relationship between the identity of the discovered terminal during the device discovery process and the application layer identity of the discovered terminal.

The identity of the discovered terminal may be a user equipment identity or may be an identity of the discovered terminal at L1, an identity of the discovered terminal at L2, etc. The application layer identity of the discovered terminal may correspond to the identity of the application that triggers the device discovery in the discovered terminal. After receiving the discovery control signal carrying the mapping relationship, the network device or the discovery terminal only needs to receive one of the identity of the discovered terminal and the application layer identity of the discovered terminal to determine the other identity based on the mapping relationship.

In an embodiment of the present disclosure, the first frequency is a frequency on a licensed band or a frequency on an unlicensed band. Since the discovery signal generally requires less communication resources, the discovery signal may be sent using the unlicensed band, and the discovery signal will also occupy the unlicensed band for a relatively short period of time, which will not easily affect the communication of other devices that need to use the unlicensed band. In order to use the unlicensed band, Listen Before Talk (LBT) needs to be performed for the unlicensed band.

FIG. 2 shows a schematic flowchart of another method for transceiving a signal according to an embodiment of the present disclosure. As shown in FIG. 2, the method further includes S201 and S202.

In the step S201, a ranging signal for determining a distance between terminals is transceived at a third frequency.

In the step S202, a ranging control signal for controlling the determination of the distance is transceived at a fourth frequency.

The third frequency is different from the fourth frequency.

In an embodiment of the present disclosure, after the first terminal is discovered by the second terminal, or after the first terminal discovers the second terminal, the ranging may be further performed if the first terminal and the second terminal determine that a ranging-based service needs to be performed.

During the ranging process, the first terminal may transceive at the third frequency the ranging signal for determining the distance between the terminals, and may transceive at the fourth frequency the ranging control signal for controlling the determination of the distance.

Since the third frequency and the fourth frequency are different, it is realized that the ranging signal and the ranging control signal are respectively transceived at different frequencies. Accordingly, it is convenient to separately control the transmission of the ranging signal and the ranging control signal, and to a certain extent, the transceiving of one of the signals can be prevented from being interfered by the other signal.

FIG. 3 shows a schematic flowchart of a method for receiving a signal according to an embodiment of the present disclosure. The method for receiving the signal shown in this embodiment may be applicable to a network device, and the network device can communicate with a terminal. The terminal includes but is not limited to a communication device such as a mobile phone, a tablet computer, a wearable device, a sensor, and an Internet of Things device. The network device includes but is not limited to a base station and a core network. The base station includes but is not limited to a base station in a communication system such as a 4G base station, a 5G base station, and a 6G base station.

As shown in FIG. 3, the method for receiving the signal may include steps S301 and S302.

In the step S301, a discovery signal sent by a first terminal for device discovery is received at a first frequency.

In the step S302, a discovery control signal sent by the first terminal for controlling the device discovery is received at a second frequency.

The first frequency is different from the second frequency.

In an embodiment of the present disclosure, the first terminal may send the discovery signal at the first frequency and send the discovery control signal at the second frequency. Correspondingly, the network device may receive the discovery signal at the first frequency and receive the discover control signal at the second frequency.

It should be noted that the above steps S301 and S302 may be selectively executed by the network device, and not these two steps have to be executed. For example, only the step S302 may be executed to receive the discovery control signal without receiving the discovery signal.

Since the first frequency and the second frequency are different, it is realized that the discovery signal and the discovery control signal are respectively received at different frequencies. Accordingly, it is convenient to separately control the transmission of the discovery signal and the discovery control signal, and to a certain extent, the receiving of one of the signals can be prevented from being interfered by the other signal.

In an embodiment of the present disclosure, the method further includes sending the discovery signal to a second terminal at the first frequency. After receiving the discovery signal, the network device may send the discovery signal to the second terminal at the first frequency for the second terminal to discover the first terminal.

In an embodiment of the present disclosure, the method further includes: feeding back at the second frequency a response signal for the discovery control signal to the first terminal. The first terminal may send at the second frequency the discovery control signal to the network device to negotiate with the network device information used to control a device discovery process. After receiving the discovery control signal, the network device may feed back to the first terminal the response signal for the discovery control signal. The response signal may carry a negotiation result, such as a temporary identity assigned to the first terminal to be used in the device discovery process.

FIG. 4 shows a schematic flowchart of a method for transceiving a signal according to an embodiment of the present disclosure. The method for transceiving the signal shown in this embodiment may be applicable to a first terminal, which includes but is not limited to a communication device such as a mobile phone, a tablet computer, a wearable device, a sensor, and an Internet of Things device. The first terminal may serve as a user equipment to communicate with a network device, which includes but is not limited to a base station and a core network. The base station includes but is not limited to a base station in a communication system such as a 4G base station, a 5G base station, and a 6G base station.

As shown in FIG. 4, the method for transceiving the signal may include steps S401 and S402.

In the step S401, a ranging signal for determining a distance between terminals is transceived at a third frequency.

In the step S402, a ranging control signal for controlling the determination of the distance is transceived at a fourth frequency.

The third frequency is different from the fourth frequency.

It should be noted that an execution order of the above steps S401 and S402 is in no particular order. The execution order may be set as needed, or the above steps S401 and S402 may be executed simultaneously.

In an embodiment of the present disclosure, during the ranging process, the first terminal may serve as a starting terminal for the ranging, and the second terminal may serve as a target terminal for the ranging. Conversely, the second terminal may serve as the starting terminal for the ranging, and the first terminal may serve as the target terminal for the ranging. The starting terminal refers to a terminal that initiates the ranging and may send the ranging signal to the target terminal.

An illustrative description of embodiments of the present disclosure is mainly given in a case that the first terminal serves as the starting terminal and the second terminal serves as the target terminal. The first terminal and the second terminal do not refer to certain terminals in particular, but refer to any two different terminals.

In an embodiment of the present disclosure, the ranging signal may carry information that is able to characterize an identity of the first terminal, such as an identity of the first terminal at L1 or an identity of the first terminal at L2.

After receiving the ranging signal, the second terminal may determine that it needs to perform ranging with the first terminal, and then may perform the ranging based on a corresponding ranging algorithm. The ranging algorithm includes but is not limited to unilateral ranging and bilateral ranging.

Based on the unilateral ranging, the first terminal sends the ranging signal to the second terminal, and after receiving the ranging signal, the second terminal sends a response signal (which may also be the ranging signal) to the first terminal. The first terminal may, according to a duration from sending the ranging signal to receiving the response signal, and a duration from the second terminal receiving the ranging signal to sending to the first terminal the response signal, calculate a round-trip time of the ranging signal between the first terminal and the second terminal, and then calculate a distance between the first terminal and the second terminal based on the round-trip time and a propagation speed of the signal (such as a speed of light). The reception and transmission of the ranging signal and the response signal may be performed at the third frequency.

It should be noted that the ranging signal in all embodiments of the present disclosure may be one or more reference signals.

Based on the bilateral ranging, the first terminal may send a first ranging signal to the second terminal within an agreed time window, and the second terminal receives the first ranging signal within the agreed time window;

after receiving the first ranging signal, the second terminal replies a second ranging signal to the first terminal, where a time interval between the second terminal receiving the first ranging signal and the second terminal replying the second ranging signal to the first terminal may be calculated as first time information;

after receiving the second ranging signal, the first terminal replies a third ranging signal to the second terminal, where a time interval between the first terminal receiving the second ranging signal and the first terminal replying the third ranging signal to the second terminal may be calculated as second time information, and a time interval between the first terminal sending the first ranging signal and the first terminal receiving the second ranging signal may be calculated as third time information; and after the second terminal receives the third ranging signal, a time interval between sending the second ranging signal and receiving the third ranging signal may be calculated as fourth time information.

If the first terminal is required to calculate a ranging result, the second terminal may send the first time information and the fourth time information to the first terminal. If the second terminal is required to calculate the ranging result, the first terminal may send the second time information and the third time information to the second terminal. The first terminal and/or the second terminal may calculate a round-trip time between the first terminal and the second terminal based on the first time information, the second time information, the third time information and the fourth time information, and then calculate the distance between the first terminal and the second terminal based on the round-trip time and the propagation speed of signal (such as the speed of light).

In an embodiment of the present disclosure, in order to make the ranging process proceed smoothly, the first terminal may further send the ranging control signal. For example, the first terminal sends the ranging control signal to the network device to negotiate with the network device an identity used by the first terminal during the ranging process, and the first terminal may also send the ranging control signal to the second terminal to send the ranging result, indicate that the ranging fails, etc.

In the related arts, the ranging signal and the ranging control signal are transceived at the same frequency. However, there are great differences in contents and functions of the ranging signal and the ranging control signal, and transmission requirements that the ranging signal and the ranging control signal need to meet are also different. Transceiving the ranging signal and the ranging control signal at the same frequency is inconvenient to control the transmission of the ranging signal and the ranging control signal and may cause the transceiving of one signal to be interfered by the other signal. For example, some terminals among a plurality of terminals send the ranging signal, while some terminals among the plurality of terminals send the ranging control signal. If the first terminal receives the ranging signal and the ranging control signal at the same frequency, a case that the ranging signal and the ranging control signal arrive at the same time may occur, but the first terminal can only receive one signal at the same moment, causing the first terminal to discard of a plurality of signals arriving at the same time.

According to embodiments of the present disclosure, the ranging signal may be transceived at the third frequency, and the ranging control signal may be transceived at the fourth frequency, thereby realizing to respectively transceive the ranging signal and the ranging control signal at different frequencies. Accordingly, it is convenient to separately control the transmission of the ranging signal and the ranging control signal, and to a certain extent, the transceiving of one of the signals can be prevented from being interfered by the other signal.

It should be noted that the third frequency may be the same as or different from the first frequency in the above embodiments, and the fourth frequency may be the same as or different from the second frequency in the above embodiments, which may be set as needed.

In an embodiment of the present disclosure, the ranging signal is transceived based on direct communication technologies. For example, the ranging signal may be transceived based on a sidelink mode, a Vehicle To Everything (V2X) mode, a WiFi direct mode, an Ultra Wide Band (UWB) mode, a Bluetooth mode and other modes. Transceiving the ranging signal based on the direct communication technologies can ensure that after the starting terminal sends the ranging signal, the target terminal can receive the ranging signal as soon as possible.

In an embodiment of the present disclosure, the ranging signal is a second signal sequence of a physical layer. The second signal sequence includes but is not limited to a Zadoff-Chu sequence.

In an embodiment of the present disclosure, the second signal sequence is used to carry part or all of an identity at L1 of a terminal sending the ranging signal. The second signal sequence itself may carry some information, for example, it may carry part or all of the identity at L1 of the terminal sending the ranging signal. The specific amount of information that can be carried may depend on the number of signal sequences.

In an embodiment of the present disclosure, the second signal sequence has a second payload, and the second payload is used to carry at least one of:

an identity of the terminal sending the ranging signal, an identity at L1 of the terminal sending the ranging signal, an identity at L2 of the terminal sending the ranging signal, the first time information based on the bilateral ranging, the second time information based on the bilateral ranging, and the third time information based on the bilateral ranging;

where the first time information represents a time interval between the target terminal receiving the first ranging signal from the starting terminal and the target terminal replying the second ranging signal to the starting terminal, the second time information represents a time interval between the starting terminal receiving the second ranging signal and the starting terminal replying a third ranging signal to the target terminal, and the third time information represents a time interval between the starting terminal sending the first ranging signal and the starting terminal receiving the second ranging signal.

By adding a first payload to the first signal sequence, more information may be carried by the first payload. The identity of the terminal sending the ranging signal may be a unique identity of the terminal, such as an International Mobile Subscriber Identity (IMSI), a Temporary Mobile Subscriber Identity (TMSI), an S-TMSI, a Cell Radio Network Temporary Identity (C-RNTI), an I-RNTI. In addition, the identity of the terminal sending the ranging signal may also be a unique temporary identity within a specified period and/or within a specified area configured by the network device for the terminal sending the ranging signal.

In the bilateral ranging, after the second terminal receives the third ranging signal, the time interval between sending the second ranging signal and receiving the third ranging signal may be calculated as the fourth time information. Before the second terminal receives the third ranging signal, the first terminal and the second terminal still exchange the ranging signals. After the second terminal receives the third ranging signal, the first terminal and the second terminal will not exchange the ranging signals.

The first time information, the second time information and the third time information can all be calculated before the second terminal receives the third ranging signal, so they may be carried in the load of the ranging signal and sent, while the fourth time information is calculated after the second terminal receives the third ranging signal, so it may be sent through ranging control information, rather than the payload of the ranging signal.

In an embodiment of the present disclosure, the second payload is physical layer information, or a control plane data packet, or a user plane data packet, which may be, for example, a Medium Access Control Protocol Data Unit (MAC PDU).

In an embodiment of the present disclosure, the transceiving at the fourth frequency the ranging control signal for controlling the determination of the distance includes: sending at the fourth frequency the ranging control signal to the network device or the second terminal, and the distance is a distance between the first terminal and the second terminal. The first terminal may send the ranging control signal to the network device or the second terminal. Based on a specific function of the ranging control signal, the ranging control signal may be sent to the network device or the second terminal. For example, the ranging control signal is used to negotiate with the network device, then the ranging control signal may be sent to the network device. For example, the ranging control signal is used to carry the ranging result, then the ranging control signal may be sent to the second terminal.

In an embodiment of the present disclosure, the ranging control signal includes at least one of: ranging request information, ranging response information, ranging failure information and ranging result information. The ranging control information may be sent using a Uu interface, or other interfaces may also be selected as needed.

In an embodiment of the present disclosure, the ranging request information carries at least one of:

an identity of a terminal receiving the ranging request information (that is, the identity of the terminal sending the ranging signal for the network device to send, based on the identity, request information to the corresponding terminal), ranging capability information (such as, a supported bandwidth, the number of antennas, etc.) of a terminal sending the ranging request information, a ranging session identity, an identity of the ranging signal at L1, an identity of the ranging signal at L2, a ranging bandwidth, and time information receiving the ranging signal (which may be a time window in which the starting terminal receives the ranging signal, or a time window in which the target terminal receives the ranging signal).

In an embodiment of the present disclosure, the ranging response information carries at least one of:

an identity of a terminal receiving the ranging response information, ranging capability information (such as, a supported bandwidth, the number of antennas, etc.) of a terminal sending the ranging response information, an identity of the ranging signal at L1, an identity of the ranging signal at L2, a ranging bandwidth, and time information receiving the ranging signal (which may be a time window in which the starting terminal receives the ranging signal, or a time window in which the target terminal receives the ranging signal).

In an embodiment of the present disclosure, the ranging failure information carries at least one of:

an identity of a terminal receiving the ranging failure information, a ranging session identity, a ranging signal quality, and a reason for ranging failure (for example, a transceiving time of the ranging signal is earlier than a receiving time of the ranging response information, the ranging signal is not received, and the ranging response information is not received, etc.).

The ranging failure may be caused by one or more of the following situations: a transceiving time of the ranging signal is earlier than a receiving time of the ranging response information, the ranging signal is not received within an agreed period of time of receiving the ranging signal, the ranging response information is not received within an agreed period of time of receiving the ranging response information, and the ranging signal quality is less than a threshold value.

In an embodiment of the present disclosure, the ranging result information carries at least one of:

result information based on the unilateral ranging, result information based on the bilateral ranging, angle of arrival information, angle of departure information, and the distance.

In an embodiment of the present disclosure, the result information based on the bilateral ranging includes at least one of:

first time information based on the bilateral ranging, second time information based on the bilateral ranging, third time information based on the bilateral ranging, and fourth time information based on the bilateral ranging; and where the first time information represents a time interval between the target terminal receiving the first ranging signal from the starting terminal and the target terminal replying the second ranging signal to the starting terminal, the second time information represents a time interval between the starting terminal receiving the second ranging signal and the starting terminal replying the third ranging signal to the target terminal, the third time information represents a time interval between the starting terminal sending the first ranging signal and the starting terminal receiving the second ranging signal, and the fourth time information represents a time interval between the target terminal sending the second ranging signal and the target terminal receiving the third ranging signal.

In the bilateral ranging, after the second terminal receives the third ranging signal, the time interval between sending the second ranging signal and receiving the third ranging signal may be calculated as the fourth time information. Before the second terminal receives the third ranging signal, the first terminal and the second terminal still exchange the ranging signals. After the second terminal receives the third ranging signal, the first terminal and the second terminal will not exchange the ranging signals.

The first time information, the second time information and the third time information can all be calculated before the second terminal receives the third ranging signal, so the selection may be made that the first time information, the second time information and the third time information may be carried in the load of the ranging signal and sent or may be carried in the result information of the ranging control information and sent, while the fourth time information is calculated after the second terminal receives the third ranging signal, so it may be sent through ranging control information, rather than the payload of the ranging signal.

In an embodiment of the present disclosure, the third frequency is a frequency on the licensed band or a frequency on the unlicensed band. Since the ranging signal (generally a reference signal) requires less communication resources, the ranging signal may be sent using the unlicensed band, and the ranging signal will also occupy the unlicensed band for a relatively short period of time, which will not easily affect the communication of other devices that need to use the unlicensed band. In order to use the unlicensed band, Listen Before Talk (LBT) needs to be performed for the unlicensed band.

FIG. 5 shows a schematic flowchart of another method for transceiving a signal according to an embodiment of the present disclosure. As shown in FIG. 5, the method further includes steps S501 and S502.

In the step S501, a discovery signal for device discovery is transceived at a first frequency.

In the step S502, a discovery control signal for controlling the device discovery is transceived at a second frequency.

The first frequency is different from the second frequency.

In an embodiment of the present disclosure, before or after the ranging, if a discovery operation is required to be performed, the first terminal may transceive at the first frequency the discovery signal for the device discovery, and transceive at the second frequency the discovery control signal for controlling the device discovery.

Since the first frequency and the second frequency are different, it is realized that the discovery signal and the discovery control signal are respectively transceived at different frequencies. Accordingly, it is convenient to separately control the transmission of the discovery signal and the discovery control signal, and to a certain extent, the transceiving of one of the signals can be prevented from being interfered by the other signal.

FIG. 6 shows a schematic flowchart of a method for receiving a signal according to an embodiment of the present disclosure. The method for receiving the signal shown in this embodiment may be applicable to a network device, and the network device can communicate with a terminal. The terminal includes but is not limited to a communication device such as a mobile phone, a tablet computer, a wearable device, a sensor, and an Internet of Things device. The network device includes but is not limited to a base station and a core network. The base station includes but is not limited to a base station in a communication system such as a 4G base station, a 5G base station, and a 6G base station.

As shown in FIG. 6, the method for receiving the signal may include steps S601 and S602.

In the step S601, a ranging signal sent by a first terminal for determining a distance between terminals is received at a third frequency.

In the step S602, a ranging control signal sent by the first terminal for controlling the determination of the distance is received at a fourth frequency.

The third frequency is different from the fourth frequency.

In an embodiment of the present disclosure, the first terminal may send the ranging signal at the third frequency and send the ranging control signal at the fourth frequency. Correspondingly, the network device may receive the ranging signal at the third frequency and receive the ranging control signal at the fourth frequency.

It should be noted that the above steps S601 and S602 may be selectively executed by the network device, and not these two steps have to be executed. For example, only the step S602 may be executed to receive the ranging control signal without receiving the ranging signal.

Since the third frequency and the fourth frequency are different, it is realized that the ranging signal and the ranging control signal are respectively received at different frequencies. Accordingly, it is convenient to separately control the transmission of the ranging signal and the ranging control signal, and to a certain extent, the receiving of one of the signals can be prevented from being interfered by the other signal.

In an embodiment of the present disclosure, the method further includes: sending the ranging signal to the second terminal at the third frequency. After receiving the ranging signal, the network device may send the ranging signal to the second terminal at the third frequency for the second terminal to perform ranging with the first terminal.

In an embodiment of the present disclosure, the method further includes: feeding back at the fourth frequency a response signal for the ranging control signal to the first terminal. The first terminal may send at the fourth frequency the ranging control signal to the network device to negotiate with the network device information used to control the ranging process. After receiving the ranging control signal, the network device may feed back to the first terminal the response signal for the ranging control signal. The response signal may carry a negotiation result, such as a temporary identity assigned to the first terminal to be used in the ranging process.

Corresponding to the foregoing embodiments of the method for transceiving the signal and the method for receiving the signal, the present disclosure further provides embodiments of an apparatus for transceiving a signal and an apparatus for receiving a signal.

FIG. 7 shows a schematic block diagram of an apparatus for transceiving a signal according to an embodiment of the present disclosure. The apparatus for transceiving the signal shown in this embodiment may be applicable to a first terminal, which includes but is not limited to a communication device such as a mobile phone, a tablet computer, a wearable device, a sensor, and an Internet of Things device. The first terminal may serve as a user equipment to communicate with a network device, which includes but is not limited to a base station and a core network. The base station includes but is not limited to a base station in a communication system such as a 4G base station, a 5G base station, and a 6G base station.

As shown in FIG. 7, the apparatus for transceiving the signal may include:

a discovery signal transceiver module 701, configured to transceive at a first frequency a discovery signal for device discovery; and a first control signal transceiver module 702, configured to transceive at a second frequency a discovery control signal for controlling the device discovery;

the first frequency is different from the second frequency.

In an embodiment of the present disclosure, the discovery signal is transceived based on a direct communication technology.

In an embodiment of the present disclosure, the discovery signal is a first signal sequence of a physical layer.

In an embodiment of the present disclosure, the first signal sequence is used to carry part or all of an identity of a discovered terminal at L1.

In an embodiment of the present disclosure, the first signal sequence has a first payload, and the first payload is used to carry at least one of: an identity of an application corresponding to the device discovery, an identity of a discovered terminal, an identity of the discovered terminal at L1, and an identity of the discovered terminal at L2.

In an embodiment of the present disclosure, the first payload is physical layer information, a control plane data packet, or a user plane data packet.

In an embodiment of the present disclosure, the discovery signal is a control plane data packet or a user plane data packet.

In an embodiment of the present disclosure, the first control signal transceiver module is configured to send the discovery control signal to a network device at the second frequency.

In an embodiment of the present disclosure, the discovery control signal is used to request the network device to assign an identity to a discovered terminal.

In an embodiment of the present disclosure, a reason for requesting the network device to assign the identity to the discovered terminal is further carried in the discovery control signal.

In an embodiment of the present disclosure, the discovery control signal is carried in a radio access control message or in a non-access stratum message.

In an embodiment of the present disclosure, a mapping relationship between an identity of a terminal discovered during a device discovery process and an application layer identity of the discovered terminal is carried in the discovery control signal.

In an embodiment of the present disclosure, the first frequency is a frequency on a licensed band or a frequency on an unlicensed band.

In an embodiment of the present disclosure, the apparatus further includes: a ranging signal transceiver module, configured to transceive at a third frequency a ranging signal for determining a distance between terminals; and a second control signal transceiver module, configured to transceive at a fourth frequency a ranging control signal for controlling the determination of the distance; the third frequency is different from the fourth frequency.

Figure 8:
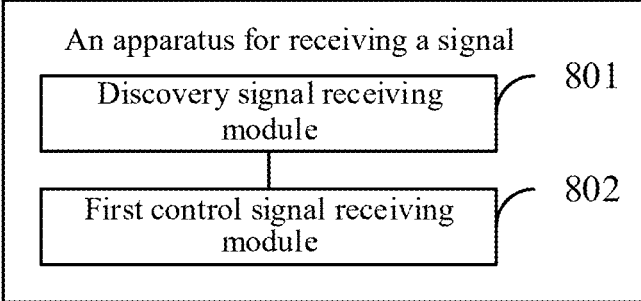
FIG. 8 shows a schematic block diagram of an apparatus for receiving a signal according to an embodiment of the present disclosure.

FIG. 8 shows a schematic block diagram of an apparatus for receiving a signal according to an embodiment of the present disclosure. The apparatus for receiving the signal shown in this embodiment may be applicable to a network device, and the network device can communicate with a terminal. The terminal includes but is not limited to a communication device such as a mobile phone, a tablet computer, a wearable device, a sensor, and an Internet of Things device. The network device includes but is not limited to a base station and a core network. The base station includes but is not limited to a base station in a communication system such as a 4G base station, a 5G base station, and a 6G base station.

As shown in FIG. 8, the apparatus for receiving the signal may include:

a discovery signal receiving module 801, configured to receive at a first frequency a discovery signal sent by a first terminal for device discovery; and a first control signal receiving module 802, configured to receive at a second frequency a discovery control signal sent by the first terminal for controlling the device discovery;

the first frequency is different from the second frequency.

In an embodiment of the present disclosure, the apparatus further includes: a discovery signal sending module, configured to send the discovery signal to a second terminal at the first frequency.

In an embodiment of the present disclosure, the apparatus further includes: a response signal sending module, configured to feed back at the second frequency a response signal for the discovery control signal to the first terminal.

Figure 9:
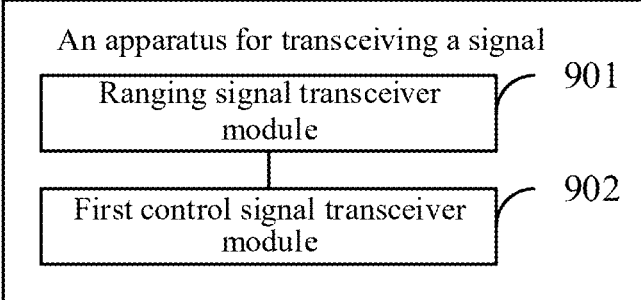
FIG. 9 shows a schematic block diagram of an apparatus for transceiving a signal according to an embodiment of the present disclosure.

FIG. 9 shows a schematic block diagram of an apparatus for transceiving a signal according to an embodiment of the present disclosure. The apparatus for transceiving the signal shown in this embodiment may be applicable to a first terminal, which includes but is not limited to a communication device such as a mobile phone, a tablet computer, a wearable device, a sensor, and an Internet of Things device. The first terminal may serve as a user equipment to communicate with a network device, which includes but is not limited to a base station and a core network. The base station includes but is not limited to a base station in a communication system such as a 4G base station, a 5G base station, and a 6G base station.

As shown in FIG. 9, the apparatus for transceiving the signal may include:

a ranging signal transceiver module 901, configured to transceive at a third frequency a ranging signal for determining a distance between terminals; and a first control signal transceiver module 902, configured to transceive at a fourth frequency a ranging control signal for controlling the determination of the distance;

the third frequency is different from the fourth frequency.

In an embodiment of the present disclosure, the ranging signal is transceived based on a direct communication technology.

In an embodiment of the present disclosure, the ranging signal is a second signal sequence of a physical layer.

In an embodiment of the present disclosure, the second signal sequence is used to carry part or all of an identity at L1 of a terminal sending the ranging signal.

In an embodiment of the present disclosure, the second signal sequence has a second payload, and the second payload is used to carry at least one of: an identity of a terminal sending the ranging signal, an identity at L1 of the terminal sending the ranging signal, an identity at L2 of the terminal sending the ranging signal, first time information based on bilateral ranging, second time information based on the bilateral ranging, and third time information based on the bilateral ranging; and the first time information represents a time interval between a target terminal receiving a first ranging signal from a starting terminal and the target terminal replying a second ranging signal to the starting terminal; the second time information represents a time interval between the starting terminal receiving the second ranging signal and the starting terminal replying a third ranging signal to the target terminal; and the third time information represents a time interval between the starting terminal sending the first ranging signal and the starting terminal receiving the second ranging signal.

In an embodiment of the present disclosure, the second payload is physical layer information, a control plane data packet, or a user plane data packet.

In an embodiment of the present disclosure, the first control signal transceiver module is configured to send at the fourth frequency the ranging control signal to a network device or a second terminal, and the distance is a distance between the first terminal and the second terminal.

In an embodiment of the present disclosure, the ranging control signal includes at least one of: ranging request information, ranging response information, ranging failure information, and ranging result information.

In an embodiment of the present disclosure, the ranging request information carries at least one of: an identity of a terminal receiving the ranging request information, ranging capability information of a terminal sending the ranging request information, a ranging session identity, an identity of the ranging signal at L1, an identity of the ranging signal at L2, a ranging bandwidth, and time information receiving the ranging signal.

In an embodiment of the present disclosure, the ranging response information carries at least one of: an identity of a terminal receiving the ranging response information, ranging capability information of a terminal sending the ranging response information, an identity of the ranging signal at L1, an identity of the ranging signal at L2, a ranging bandwidth, and time information receiving the ranging signal.

In an embodiment of the present disclosure, the ranging failure information carries at least one of: an identity of a terminal receiving the ranging failure information, a ranging session identity, a ranging signal quality, and a reason for ranging failure.

In an embodiment of the present disclosure, the ranging result information carries at least one of: result information based on unilateral ranging, result information based on bilateral ranging, angle of arrival information, angle of departure information, and the distance.

In an embodiment of the present disclosure, the result information based on the bilateral ranging includes at least one of: first time information based on the bilateral ranging, second time information based on the bilateral ranging, third time information based on the bilateral ranging, and fourth time information based on the bilateral ranging; and the first time information represents a time interval between a target terminal receiving a first ranging signal from a starting terminal and the target terminal replying a second ranging signal to the starting terminal; the second time information represents a time interval between the starting terminal receiving the second ranging signal and the starting terminal replying a third ranging signal to the target terminal; the third time information represents a time interval between the starting terminal sending the first ranging signal and the starting terminal receiving the second ranging signal; and the fourth time information represents a time interval between the target terminal sending the second ranging signal and the target terminal receiving the third ranging signal.

In an embodiment of the present disclosure, the third frequency is a frequency on a licensed band or a frequency on an unlicensed band.

In an embodiment of the present disclosure, the apparatus further includes: a discovery signal transceiver module, configured to transceive at a first frequency a discovery signal for device discovery; and a second control signal transceiver module, configured to transceive at a second frequency a discovery control signal for controlling the device discovery; the first frequency is different from the second frequency.

Figure 10:
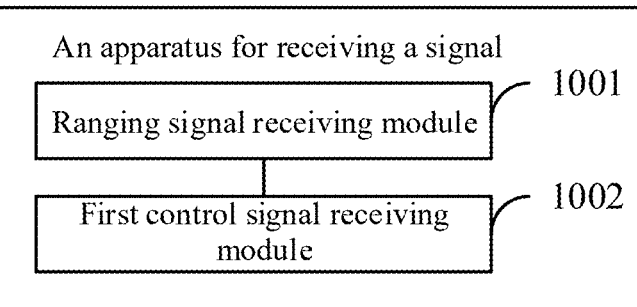
FIG. 10 shows a schematic block diagram of an apparatus for receiving a signal according to an embodiment of the present disclosure.

FIG. 10 shows a schematic block diagram of an apparatus for receiving a signal according to an embodiment of the present disclosure. The apparatus for receiving the signal shown in this embodiment may be applicable to a network device, and the network device can communicate with a terminal. The terminal includes but is not limited to a communication device such as a mobile phone, a tablet computer, a wearable device, a sensor, and an Internet of Things device. The network device includes but is not limited to a base station and a core network. The base station includes but is not limited to a base station in a communication system such as a 4G base station, a 5G base station, and a 6G base station. As shown in FIG. 10, the apparatus for receiving the signal may include:

a ranging signal receiving module 1001, configured to receive at a third frequency a ranging signal sent by a first terminal for determining a distance between terminals; and a first control signal receiving module 1002, configured to receive at a fourth frequency a ranging control signal sent by the first terminal for controlling the determination of the distance;

the third frequency is different from the fourth frequency.

In an embodiment of the present disclosure, the apparatus further includes: a ranging signal sending module, configured to send the ranging signal to a second terminal at the third frequency.

In an embodiment of the present disclosure, the apparatus further includes: a response signal sending module, configured to feed back at the fourth frequency a response signal for the ranging control signal to the first terminal.

Regarding the apparatus in the foregoing embodiments, a specific manner in which each module executes operations has been described in detail in embodiments related to the method, and will not be described in detail here.

For the apparatus embodiments, since they basically correspond to the method embodiments, the relevant parts can be referred to the description of the method embodiments. The apparatus embodiments described above are only illustrative. The units described as separated parts may or may not be physically separated, and the parts shown as units may or may not be physical units, that is, the units may be located in one place, or may be distributed over a plurality of network units. Some or all of the modules may be selected according to actual needs to achieve the objectives of the solutions of the present disclosure. Those of ordinary skill in the art can understand and implement the present disclosure without paying creative labor.

Embodiments of the present disclosure further provide a communication device, including: a processor; and a memory configured to store a computer program. The computer program, when executed by the processor, implements the method for transceiving the signal in any embodiment as described above.

Embodiments of the present disclosure further provide a communication device, including: a processor; and a memory configured to store a computer program. The computer program, when executed by the processor, implements the method for receiving the signal in any embodiment as described above.

Embodiments of the present disclosure further provide a non-transitory computer-readable storage medium configured to store a computer program. The computer program, when executed by the processor, implements steps in the method for transceiving the signal in any embodiment as described above.

Embodiments of the present disclosure further provide a non-transitory computer-readable storage medium configured to store a computer program. The computer program, when executed by the processor, implements steps in the method for receiving the signal in any embodiment as described above.

Figure 11:
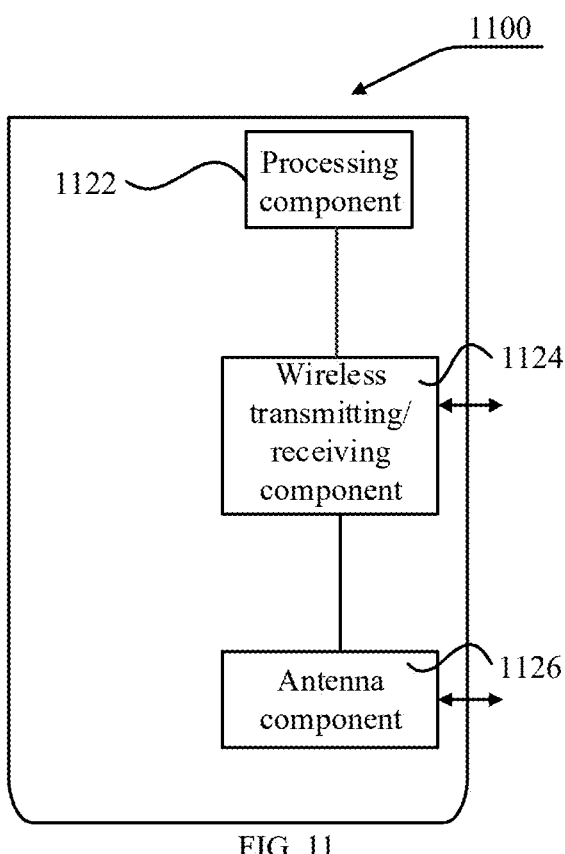
FIG. 11 shows a schematic block diagram of an apparatus for receiving a signal according to an embodiment of the present disclosure.

As shown in FIG. 11, FIG. 11 shows a schematic block diagram of an apparatus 1100 for receiving a signal according to an embodiment of the present disclosure. The apparatus 1100 may be provided as a base station. Referring to FIG. 11, the apparatus 1100 includes a processing component 1122, a wireless transmitting/receiving component 1124, an antenna component 1126, and a signal processing part specific to a wireless interface. The processing component 1122 may further include one or more processors. One of the processors in the processing component 1122 may be configured to perform the method for receiving the signal in any embodiment as described above.

Figure 12:
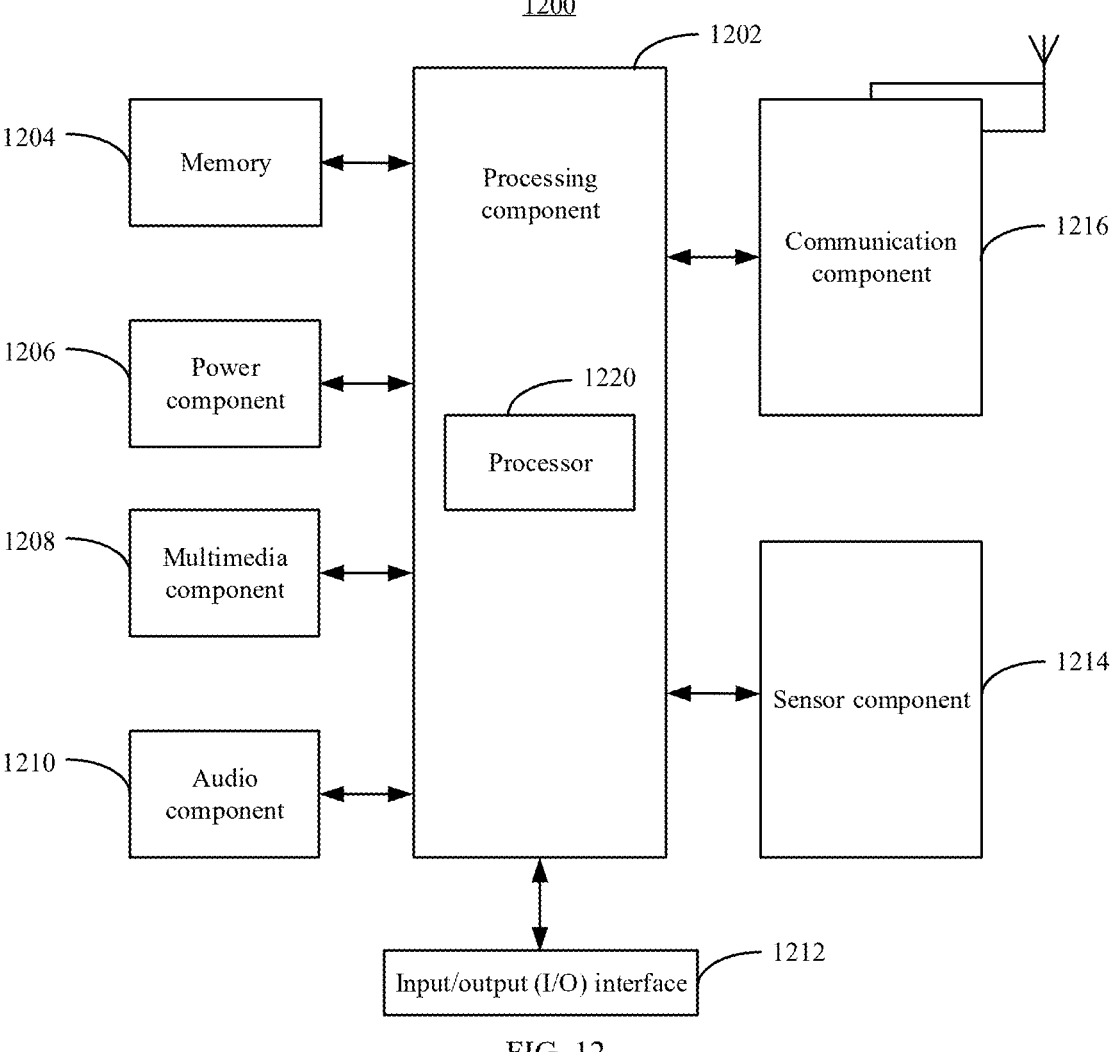
FIG. 12 shows a schematic block diagram of an apparatus for transceiving a signal according to an embodiment of the present disclosure.

FIG. 12 shows a schematic block diagram of an apparatus 1200 for transceiving a signal according to an embodiment of the present disclosure. For example, the apparatus 1200 may be a mobile phone, a computer, a digital broadcast terminal, a messaging device, a gaming console, a tablet device, a medical device, an exercise device, a personal digital assistant, and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the method for transceiving the signal as described above. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may further include a light sensor, such as a CMOS or CCD image sensor, for use in imaging applications. In some embodiments, the sensor component 1214 may further include an accelerometer sensor, a gyroscope sensor, a magnetic sensor, a pressure sensor, or a temperature sensor.

The communication component 1216 is configured to facilitate communication, wired or wirelessly, between the apparatus 1200 and other devices. The apparatus 1200 can access a wireless network based on a communication standard, such as WiFi, 2G, 3G, 4G LTE, 5G NR or a combination thereof. In one example embodiment, the communication component 1216 receives a broadcast signal or broadcast associated information from an external broadcast management system via a broadcast channel. In one example embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments of the present disclosure, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for transceiving the signal described above.

In embodiments of the present disclosure, there is further provided a non-transitory computer readable storage medium including instructions, such as the memory 1204 including instructions, and the instructions are executable by the processor 1220 in the apparatus 1200 to perform the method for transceiving the signal described above. For example, the non-transitory computer readable storage medium may be a ROM, a RAM, a CD-ROM, a magnetic tape, a floppy disc, an optical data storage device, and the like.

Other implementations of embodiments of the present disclosure will be apparent to those skilled in the art from consideration of the specification and practice of the present disclosure disclosed herein. The present disclosure is intended to cover any variations, uses, or adaptations embodiments of the present disclosure, which are in accordance with the general principles of embodiments of the present disclosure and include common general knowledge or conventional technical means in the art that are not disclosed in the present disclosure. The specification and embodiments are illustrative, and the real scope and spirit of embodiments of the present disclosure is defined by the appended claims.

It should be understood that embodiments of the present disclosure are not limited to the precise structures that have been described above and shown in the drawings, and various modifications and changes can be made without departing from the scope thereof. The scope of embodiments of the present disclosure is limited only by the appended claims.

It should be noted that, relational terms such as "first" and "second" in the disclosure are used only to distinguish an entity or operation from another entity or operation, and do not necessarily require or imply any actual relationship or sequence existed between these entities or operations. The terms "comprises," "includes," or any other variation thereof are intended to encompass non-exclusive inclusion such that a process, a method, an article or a device comprising a list of elements includes not only those elements, but also other elements not expressly listed, or also includes elements inherent to such process, method, article or device. Without more limitations, an element qualified by the sentence "comprising a . . . " does not preclude a presence of additional identical elements in the process, method, article or device that includes the element.

The methods and apparatuses provided by embodiments of the present disclosure have been described in detail above, and specific examples are used herein to illustrate the principles and implementations of the present disclosure. The above description of embodiments is only used to help understand methods and their core ideas of the present disclosure. In addition, for those skilled in the art, according to the concept of the present disclosure, there may be changes in the specific implementation and application scope. In summary, the contents of this specification should not be construed as limiting the present disclosure.

What is claimed is:

1. A method for transceiving a signal, performed by a first terminal, and comprising:

transceiving at a first frequency a first signal; and transceiving at a second frequency a second signal;

wherein the first frequency is different from the second frequency, in response to the first signal being a discovery signal for device discovery, the first signal is a first signal sequence of a physical layer; and in response to the first signal being a ranging signal for determining a distance between terminals, the first signal is a second signal sequence of the physical layer, wherein the first signal sequence is used to carry part or all of an identity of a discovered terminal at layer 1 (L1), and the second signal sequence is used to carry part or all of an identity at L1 of a terminal sending the ranging signal, or wherein the first signal sequence has a first payload, and the first payload is used to carry at least one of following identities:

an identity of an application corresponding to the device discovery, an identity of the discovered terminal, the identity of the discovered terminal at L1, or an identity of the discovered terminal at layer 2 (L2);

the second signal sequence has a second payload, and the second payload is used to carry at least one of following information:

an identity of the terminal sending the ranging signal, an identity at L1 of the terminal sending the ranging signal; an identity at L2 of the terminal sending the ranging signal, first time information based on bilateral ranging, second time information based on the bilateral ranging, or third time information based on the bilateral ranging;

the first time information represents a time interval between a target terminal receiving a first ranging signal from a starting terminal and the target terminal replying a second ranging signal to the starting terminal; the second time information represents a time interval between the starting terminal receiving the second ranging signal and the starting terminal replying a third ranging signal to the target terminal; and third time information represents a time interval between the starting terminal sending the first ranging signal and the starting terminal receiving the second ranging signal; and the first payload is first physical layer information, a first control plane data packet, or a first user plane data packet; and the second payload is second physical layer information, a second control plane data packet, or a second user plane data packet.

2. The method according to claim 1, wherein the first signal is transceived based on a direct communication technology.

3. The method according to claim 1, wherein the discovery signal is a control plane data packet or a user plane data packet.

4. The method according to claim 1, wherein transceiving at the second frequency the second signal comprises:

sending the second signal to a network device at the second frequency;

wherein in a case that the second signal is a discovery control signal for controlling device discovery, the second signal is used to request the network device to assign an identity to a discovered terminal, and a reason for requesting the network device to assign the identity to the discovered terminal is further carried in the discovery control signal.

5. The method according to claim 4, wherein the discovery control signal is carried in a radio access control message or in a non-access stratum message.

6. The method according to claim 4, wherein a mapping relationship between an identity of a terminal discovered during a device discovery process and an application layer identity of the discovered terminal is carried in the discovery control signal.

7. The method according to claim 1, wherein the first frequency is a frequency on a licensed band or a frequency on an unlicensed band.

8. The method according to claim 1, wherein in response to the first signal being the ranging signal for determining the distance between the terminals, and the second signal being a ranging control signal for controlling the determination of the distance, transceiving at the second frequency the second signal comprises:

sending at the second frequency the second signal to a network device or a second terminal, wherein the distance is a distance between the first terminal and the second terminal.

9. The method according to claim 8, wherein the ranging control signal comprises at least one of following information:

ranging request information, ranging response information, ranging failure information, or ranging result information.

10. The method according to claim 9, wherein the ranging request information carries at least one of following information:

an identity of a terminal receiving the ranging request information, ranging capability information of a terminal sending the ranging request information, a ranging session identity, an identity at layer 1 (L1) of the ranging signal, an identity at layer 2 (L2) of the ranging signal, a ranging bandwidth, or time information receiving the ranging signal.

11. The method according to claim 9, wherein the ranging response information carries at least one of following information:

an identity of a terminal receiving the ranging response information, ranging capability information of a terminal sending the ranging response information, an identity at L1 of the ranging signal, an identity at L2 of the ranging signal, a ranging bandwidth, or time information receiving the ranging signal.

12. The method according to claim 9, wherein the ranging failure information carries at least one of following information:

an identity of a terminal receiving the ranging failure information, a ranging session identity, a ranging signal quality, or a reason for ranging failure.

13. The method according to claim 9, wherein the ranging result information carries at least one of following information:

result information based on unilateral ranging, result information based on bilateral ranging, angle of arrival information, angle of departure information, or the distance.

14. The method according to claim 13, wherein the result information based on the bilateral ranging comprises at least one of following information:

first time information based on the bilateral ranging, second time information based on the bilateral ranging, third time information based on the bilateral ranging, and fourth time information based on the bilateral ranging; and wherein the first time information represents a time interval between a target terminal receiving a first ranging signal from a starting terminal and the target terminal replying a second ranging signal to the starting terminal; the second time information represents a time interval between the starting terminal receiving the second ranging signal and the starting terminal replying a third ranging signal to the target terminal; the third time information represents a time interval between the starting terminal sending the first ranging signal and the starting terminal receiving the second ranging signal; and the fourth time information represents a time interval between the target terminal sending the second ranging signal and the target terminal receiving the third ranging signal.

15. A method for receiving a signal, performed by a network device, and comprising:

receiving at a first frequency a first signal sent by a first terminal; and receiving at a second frequency a second signal sent by the first terminal;

wherein the first frequency is different from the second frequency, in response to the first signal being a discovery signal for device discovery, the first signal is a first signal sequence of a physical layer; and in response to the first signal being a ranging signal for determining a distance between terminals, the first signal is a second signal sequence of the physical layer, wherein the first signal sequence is used to carry part or all of an identity of a discovered terminal at layer 1 (L1), and the second signal sequence is used to carry part or all of an identity at L1 of a terminal sending the ranging signal, or wherein the first signal sequence has a first payload, and the first payload is used to carry at least one of following identities:

an identity of an application corresponding to the device discovery, an identity of the discovered terminal, the identity of the discovered terminal at L1, or an identity of the discovered terminal at layer 2 (L2);

the second signal sequence has a second payload, and the second payload is used to carry at least one of following information:

an identity of the terminal sending the ranging signal, an identity at L1 of the terminal sending the ranging signal; an identity at L2 of the terminal sending the ranging signal, first time information based on bilateral ranging, second time information based on the bilateral ranging, or third time information based on the bilateral ranging;

the first time information represents a time interval between a target terminal receiving a first ranging signal from a starting terminal and the target terminal replying a second ranging signal to the starting terminal; the second time information represents a time interval between the starting terminal receiving the second ranging signal and the starting terminal replying a third ranging signal to the target terminal; and the third time information represents a time interval between the starting terminal sending the first ranging signal and the starting terminal receiving the second ranging signal; and the first payload is first physical layer information, a first control plane data packet, or a first user plane data packet; and the second payload is second physical layer information, a second control plane data packet, or a second user plane data packet.

16. The method according to claim 15, wherein the method further comprises:

sending the first signal to a second terminal at the first frequency.

17. The method according to claim 15, wherein the method further comprises:

feeding back at the second frequency a response signal for the second signal to the first terminal.

* * * * *